(No Model.)
A. WURTS.
CIRCUIT INTERRUPTING DEVICE.
No. 470,772. Patented Mar. 15, 1892.
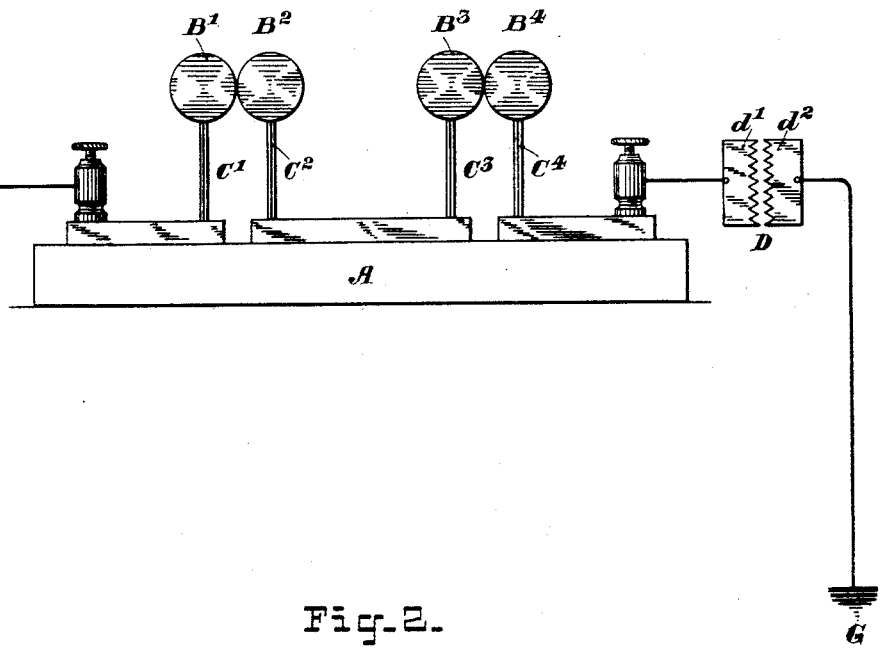
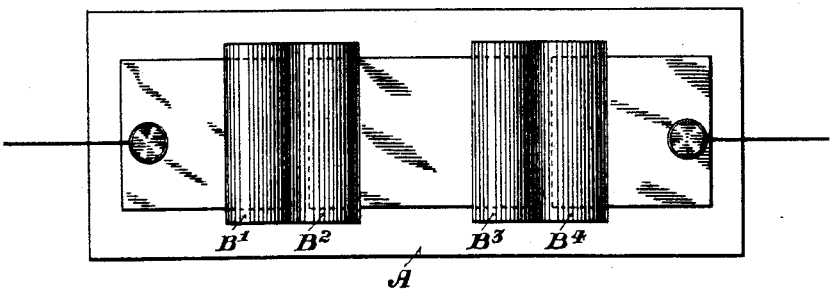
Witnesses
George Brown Jr.
Hubert C. Tener
Inventor
Alexander Wurts.
By his Attorney
Charles A. Terry.

UNITED STATES PATENT OFFICE.

ALEXANDER WURTS, OF PITTSBURG, PENNSYLVANIA, ASSIGNOR TO THE WESTINGHOUSE ELECTRIC AND MANUFACTURING COMPANY, OF SAME PLACE.

CIRCUIT-INTERRUPTING DEVICE.

SPECIFICATION forming part of Letters Patent No. 470,772, dated March 15, 1892.

Application filed November 25, 1891. Serial No. 413,082. (No model.)

*To all whom it may concern:*

Be it known that I, ALEXANDER WURTS, a citizen of the United States, residing in the city of Pittsburg, in the county of Allegheny and State of Pennsylvania, have invented a certain new and useful Improvement in Circuit-Interrupting Devices, (Case No. 473,) of which the following is a specification.

The invention relates to the class of devices employed for automatically interrupting the connections of electric circuits upon the passage of currents of predetermined or of abnormal strength—such, for instance, as those that are apt to follow lightning discharges or currents during the short-circuiting of a dynamo-electric generator of electricity or any predetermined current.

The invention consists in supporting electrodes of suitable material—such, for instance, as brass—upon thermostatic supports in such manner that they normally rest in contact or in very close proximity, so that a current of abnormal strength may pass through the supports and across from one electrode to the other. The action of this current is to cause the electrodes to separate and thus immediately interrupt the circuit-connections. This is accomplished by the action of the thermostatic supports themselves, which are so organized that they will bend away from each other and thus separate the electrodes, and in some instances there may also be a repulsive effort exerted between the electrodes themselves tending to thrust them apart.

There are different ways of carrying out the invention; but in connection with the accompanying drawings I will describe one from which I have thus far obtained the best results.

Figure 1 is an elevation of the device, showing the circuit connections in diagram; and Fig. 2 is a plan.

Referring to the figures, A represents a suitable base upon which the various parts of the apparatus are supported, and $B'$ $B^2$ $B^3$ $B^4$ a series of electrodes, here shown as being in the form of cylinders of suitable metal, such as zinc or antimony or their compounds, such as brass, German silver, &c. The electrodes are respectively supported upon thermostatic strips $C'$ $C^2$ $C^3$ $C^4$, and the circuit-connections are through the thermostats and electrodes in series. When a current of electricity of predetermined strength is caused to pass through this device, the heat generated in the thermostat tends to separate the respective electrodes from each other, thus opening the circuit-connections. The material which I employ for making the electrodes is of such character that the current passing from one to another through a very narrow air-space will be automatically interrupted, and for this purpose I have found that certain metals possess decided advantages. Thus, for instance, brass and other compounds containing zinc and likewise antimony and its compounds, I have found to be best adapted to the purpose. It seems probable that the heat of the arc causes an oxide or other form of the zinc or antimony to be produced in the form of a vapor, which seems to be a non-conductor of electricity, and thus presents a barrier to the passage of the current. The device is especially effective in connection with alternating currents. It is possible, also, that there is a repulsive effect produced by the passage of the current in addition to the action of the thermostats, causing them to separate. As many sets of electrodes as may be desired may be connected in series, thus subdividing the arc.

I have described the invention particularly as applied to electrodes of cylindrical form; but it is evident that various other shapes may be used, if desired.

In many instances it may be desirable to connect in series with the circuit-interrupting device an ordinary form of lightning-arrester, such as illustrated at D in the drawings. This consists of a pair of plates $d'$ $d^2$, separated a suitable distance, and across which a current of abnormal strength will be allowed to pass in the form of an arc. When such a current passes through a circuit thus equipped, the arc, which would otherwise be maintained at the arrester D, will be prevented from continuing by reason of the opening of the circuit at the electrodes $B'$, $B^2$, &c. This lightning-arrester may consist of electrodes of metal of the same character as the electrodes B' B², and thus advantage may be taken of the normal tendency of the electrodes to prevent the continuance of an arc between their surfaces.

I claim as my invention—

1. The combination of two electrodes normally resting in contact with each other and thermostatic supports carrying the respective electrodes, substantially as described.

2. The combination of two electrodes, of metal producing arc-destroying vapor, and a thermostatic device for separating said electrodes.

3. The combination of two electrodes, of brass or its equivalent, normally resting in contact with each other, and thermostatic supports for the respective electrodes.

4. The combination of two cylinders of brass normally resting in contact with each other, yielding thermostatic supports for the respective cylinders, and circuit-connections through said supports with said electrodes, substantially as described.

5. A circuit-interrupting device for electric circuits, consisting of an electrode containing in its composition a metal the oxide of which forms a non-conducting vapor, and a second electrode against which the first-named electrode normally rests, and a thermostat for separating the two electrodes.

6. In a circuit-interrupting device, an electrode formed of a metal having a non-conducting vaporous oxide, a second electrode normally in contact therewith, and a thermostat for separating the said electrodes upon the passage of a current of predetermined strength.

7. The combination, with two normally-separated discharge-plates, of two or more electrodes normally in contact with each other and a thermostatic device for causing the separation of the same upon the passage of an abnormal current.

8. The combination, with two normally-separated discharge-plates, of two electrodes normally in contact with each other and in series with the first-named electrodes, said electrodes consisting of brass or its equivalent, and a device for separating the contacting electrodes upon the passage of an abnormal current, substantially as described.

In testimony whereof I have hereunto subscribed my name this 23d day of November, A. D. 1891.

ALEXANDER WURTS.

Witnesses:
R. D. MERSHON,
J. W. SMITH.